(12) United States Patent
Nevins

(10) Patent No.: US 10,825,019 B2
(45) Date of Patent: Nov. 3, 2020

(54) APPARATUS AND METHOD FOR CREATION OF MULTIPLE CONFIGURABLE PAYMENT MECHANISMS WITHIN A SINGLE PRE-FUNDED ELECTRONIC PAYMENT DEVICE

(71) Applicant: Scott C. Nevins, Riverside, CT (US)

(72) Inventor: Scott C. Nevins, Riverside, CT (US)

(*) Notice: Subject to any disclaimer, the term of this patent is extended or adjusted under 35 U.S.C. 154(b) by 540 days.

(21) Appl. No.: 15/622,692

(22) Filed: Jun. 14, 2017

(65) Prior Publication Data

US 2018/0365683 A1    Dec. 20, 2018

(51) Int. Cl.
| | | |
|---|---|---|
| *G06Q 20/36* | (2012.01) | |
| *G06Q 20/28* | (2012.01) | |
| *G06Q 20/34* | (2012.01) | |
| *G06Q 20/40* | (2012.01) | |
| *G06Q 20/22* | (2012.01) | |

(52) U.S. Cl.
CPC .......... *G06Q 20/36* (2013.01); *G06Q 20/227* (2013.01); *G06Q 20/28* (2013.01); *G06Q 20/354* (2013.01); *G06Q 20/3676* (2013.01); *G06Q 20/405* (2013.01)

(58) Field of Classification Search
CPC ...... G06Q 20/20; G06Q 20/28; G06Q 20/227; G06Q 20/354; G06Q 20/405; G06Q 20/3676; G06Q 20/34; G06Q 20/40; G06Q 20/22
See application file for complete search history.

(56) References Cited

U.S. PATENT DOCUMENTS

| | | | |
|---|---|---|---|
| 5,621,640 | A | 4/1997 | Burke |
| 6,000,608 | A | 12/1999 | Dorf |
| 6,088,682 | A | 7/2000 | Burke |
| 6,189,787 | B1 | 2/2001 | Dorf |
| 6,786,418 | B1 | 9/2004 | Francois |
| 6,876,976 | B1 | 4/2005 | Setteducati |
| 7,096,003 | B2 | 8/2006 | Joao et al. |
| 7,171,370 | B2 | 1/2007 | Burke |

(Continued)

OTHER PUBLICATIONS

Alhothaily, Abdulrahman, Secure Transfer Payment Systems, Jun. 13, 2017, Sensors, 17(6), 1376 (Year: 2017).*

*Primary Examiner* — Kenneth Bartley
*Assistant Examiner* — Gregory M James
(74) *Attorney, Agent, or Firm* — Ryan, Mason & Lewis, LLP

(57) ABSTRACT

Apparatus and methods for creation of multiple configurable payment mechanisms within a single pre-funded electronic payment device are provided herein. An example payment device includes a body portion, a memory associated with the body portion and containing a first stored value application having a first application balance and a second stored value application having a second application balance, and a processor associated with the body portion and coupled to the memory. The processor can perform a load transaction in an amount equal to the first application balance, and restrict any payment transaction carried out via the first stored value application to a payment transaction wherein the recipient consists of user-selected entities. The processor can also perform a load transaction in an amount equal to the second application balance, and preclude performance of payment transactions prior to depletion of the first application balance.

19 Claims, 5 Drawing Sheets

(56) References Cited

U.S. PATENT DOCUMENTS

| | | | |
|---|---|---|---|
| 7,494,048 B2 | 2/2009 | Gusler et al. | |
| 8,219,474 B2 | 7/2012 | Sutton et al. | |
| 8,622,308 B1 * | 1/2014 | Field | G06Q 20/357 |
| | | | 235/379 |
| 8,903,358 B2 * | 12/2014 | Kiene | H04M 15/765 |
| | | | 455/408 |
| 2003/0007615 A1 * | 1/2003 | Parfait | G06Q 20/28 |
| | | | 379/114.2 |
| 2006/0259390 A1 * | 11/2006 | Rosenberger | G06Q 20/04 |
| | | | 705/35 |
| 2007/0017973 A1 * | 1/2007 | Blank | B65D 27/00 |
| | | | 235/380 |
| 2011/0106698 A1 * | 5/2011 | Isaacson | G06Q 20/105 |
| | | | 705/41 |
| 2012/0150743 A1 * | 6/2012 | Isaacson | G06Q 10/101 |
| | | | 705/44 |
| 2012/0215605 A1 * | 8/2012 | Gardner | G06Q 20/36 |
| | | | 705/14.17 |
| 2013/0132294 A1 * | 5/2013 | Schvey | G06Q 50/01 |
| | | | 705/319 |
| 2013/0268440 A1 * | 10/2013 | Tierney | G06Q 20/10 |
| | | | 705/44 |
| 2016/0125408 A1 * | 5/2016 | Crawford | G06Q 20/405 |
| | | | 705/34 |
| 2017/0011399 A1 * | 1/2017 | Steinlicht | G06Q 20/405 |

* cited by examiner

APPARATUS AND METHOD FOR CREATION OF MULTIPLE CONFIGURABLE PAYMENT MECHANISMS WITHIN A SINGLE PRE-FUNDED ELECTRONIC PAYMENT DEVICE

FIELD

The present application generally relates to information technology, and, more particularly, to apparatus and methods for electronic payment.

BACKGROUND

Payment devices having stored and/or pre-paid values in the form of a balance, such as gift cards, are commonly utilized for performing financial transactions. Additionally, such devices are also commonly provided as gifts between individuals, particularly such devices having stored and/or pre-paid values designated for payment transactions with specific recipients. Such recipients are typically commercial entities such as, for example, retail enterprises.

Separately, philanthropic monetary donations to charitable entities are also commonly carried out within the context of gifts between individuals. For example, such a gift can typically involve a first individual providing a monetary donation to a charitable entity in the name of a second individual. However, such a gift likely precludes any significant personal involvement by the second individual with the charitable entity, which could potentially facilitate further philanthropic giving and/or involvement with the charitable entity.

Further, existing payment devices and approaches fail to provide the technical capabilities of locking a discretionary portion of pre-paid funds on a device until the cardholder performs one or more payment transactions using a separate portion of pre-paid funds on the device, such as a portion dedicated exclusively for payments to one or more charitable entities. Accordingly, a need exists for a pre-paid mechanism and/or device that enables and/or requires active participation by the cardholder with respect to multiple types of payment recipients (such as both charitable and non-charitable entities).

SUMMARY

In one embodiment of the present invention, apparatus and methods for creation of multiple configurable payment mechanisms within a single pre-funded electronic payment device are provided. An example portable dual-balance payment device can include a body portion, and at least one memory associated with the body portion and containing at least (i) a first stored value application having a first application balance and (ii) a second stored value application having a second application balance. Such a portable dual-balance payment device can also include at least one processor associated with the body portion and coupled to the at least one memory. The at least one processor is operative to perform a first load transaction, in an amount equal to the first application balance, via the first stored value application contained within the at least one memory. The at least one processor is also operative to implement, in the at least one memory, a first instruction restricting any payment transaction carried out via the first stored value application to a payment transaction wherein the recipient exclusively consists of one or more user-selected entities. Additionally, the at least one processor is operative to perform a second load transaction, in an amount equal to the second application balance, via the second stored value application contained within the at least one memory. Further, the at least one processor is operative to implement, in the at least one memory, a second instruction precluding performance of any payment transaction carried out via the second stored value application prior to depletion of the first application balance.

In another embodiment of the invention, an example computer-implemented method for creating a dual-balance payment device can include processing user input comprising (i) one or more user-selected entities, (ii) a first pre-paid balance amount designated exclusively for payment transactions involving one or more of the user-selected entities as a recipient, and (iii) a second pre-paid balance amount designated for any payment transaction upon depletion of the first pre-paid balance. Such a method can also include processing funds provided by the user, and, upon a determination that the funds equal the sum of the first pre-paid balance and the second pre-paid balance, performing a load transaction via the payment device, in an amount equal to the sum of the first pre-paid balance and the second pre-paid balance. Additionally, such a method can include limiting use of a first portion of the funds exclusively to one or more payment transactions involving one or more of the user-selected entities as a recipient, wherein the first portion of the funds consists of the first pre-paid balance amount. Further, such a method can include limiting use of a second portion of the funds exclusively to one or more payment transactions executed subsequent to depletion of the first portion of the funds.

In yet another embodiment of the invention, an example computer-implemented method for processing a transaction involving a dual-balance payment device can include, upon receiving a request for executing a first payment transaction between the payment device and a first recipient, confirming (a) the identity of the first recipient as one or more entities from a set of previously established user-selected entities and (b) that the amount of the first payment transaction is less than or equal to a previously established pre-paid amount designated exclusively for payment transactions involving the user-selected entities. Subsequent to confirming (a) and (b), such a method can also include executing the first payment transaction by transmitting the amount of the first payment transaction to the first recipient. Additionally, upon receiving a request for executing a second payment transaction between the payment device and a second recipient, such a method can include confirming (c) that the pre-paid amount designated exclusively for payment transactions involving the user-selected entities has been depleted and (d) that the amount of the second payment transaction is less than or equal to a previously established pre-paid amount designated exclusively for payment transactions permitted for execution subsequent to depletion of the pre-paid amount designated exclusively for payment transactions involving the user-selected entities. Further, subsequent to confirming (c) and (d), such a method can include executing the second payment transaction by transmitting the amount of the second payment transaction to the second recipient.

Another embodiment of the invention or elements thereof can be implemented in the form of a computer program product tangibly embodying processor readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible processor-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
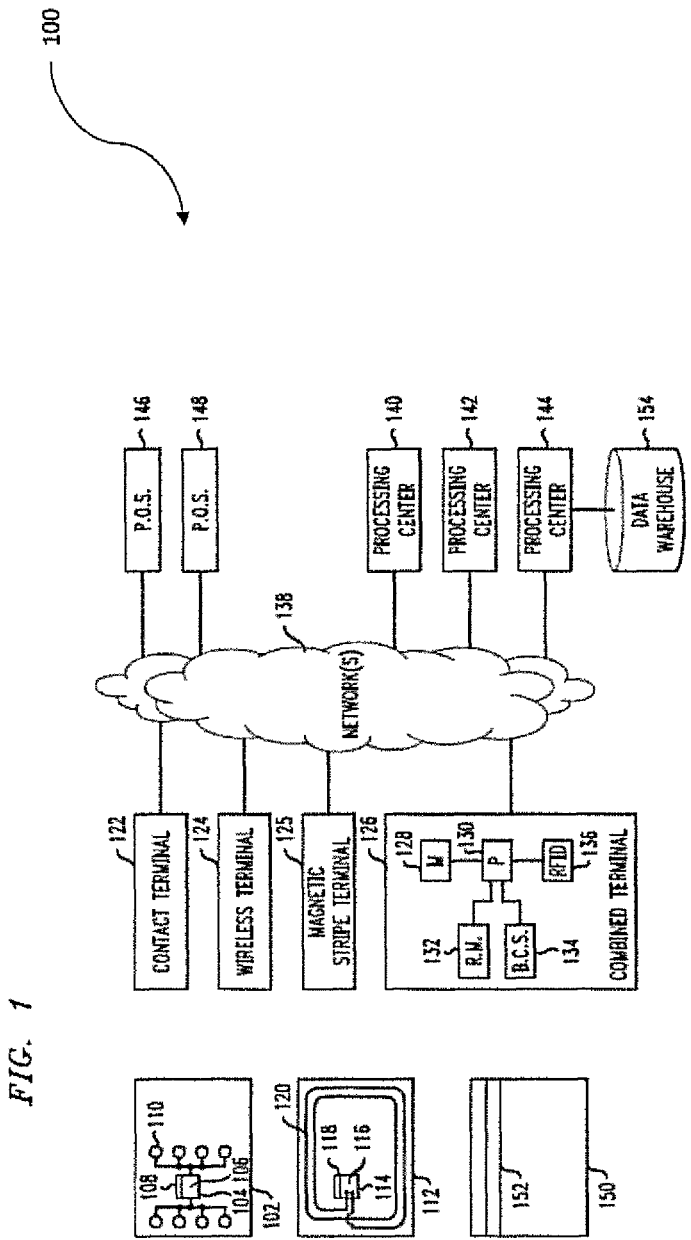
FIG. 1 shows an example of a system and components thereof that can implement techniques of the invention.

As described herein, an embodiment of the present invention includes creation of multiple configurable payment mechanisms within a single pre-funded electronic payment device. Payment devices, such as electronic payment devices (for example, smart cards having integrated circuit chips) can be implemented for a variety of payment applications. In such payment devices, the total amount of funds available to the cardholder can be maintained on the card, or can be maintained on the server of the payment provider (for example, the issuer). Also, in the case of gift cards, the total amount of funds available to the cardholder is pre-paid and stored as an established value on the card or at the payment provider server.

In at least one embodiment of the invention, the total amount of funds available to the cardholder can be partitioned into two or more distinct (pre-paid) portions. As further detailed herein, at least one of the distinct portions is restricted for use exclusively in one or more payment transactions involving one or more entities of a first designated type as the recipient (such as for example, charitable entities). Additionally, at least one of the distinct portions can be utilized for any type of payment transaction, or can be restricted for use in one or more payment transaction involving one or more entities of a second designated type as the recipient (such as for example, one or more commercial or non-charitable entities). Also, in one or more embodiments of the invention, the distinct portion of funds available designated for use in payment transactions involving the second designated type of entities can only be accessed by the cardholder subsequent to the depletion of the distinct portion(s) of funds designated for use in payment transactions involving the first designated type of entities.

It is to be appreciated that, by way merely of illustration and not limitation, one or more example embodiments of the invention described herein identify a first designated type of entity as one or more charitable entities, and identify a second designated type of entity as one or more non-charitable entities. It is noted that one or more embodiments of the invention can also be implemented with other and/or different designated types of entities. Such designated types of entities can be established and/or pre-determined by a user (such as a first user purchasing the pre-paid payment device for a second user), an issuer, etc.

Additionally, as used herein, a "charitable" entity refers to any not-for-profit entity, including, for example, charitable organizations, non-profit organizations, religious organizations, human-interest fundraising entities, government organizations, etc.

As noted above, existing payment devices and approaches fail to provide the technical capabilities of locking a second portion of pre-paid funds associated with a payment device (card) until the cardholder performs one or more payment transactions using a first portion of pre-paid funds on the device. The devices and techniques detailed herein provide the technical benefits to solve such problems and failures of the existing approaches.

By way merely of example, consider the following first example scenario, wherein Bob Smith writes a check to the American Cancer Society® in honor of Mary Jones. The American Cancer Society® then sends Bob Smith a letter acknowledging the gift and the details thereof. Additionally, the American Cancer Society® sends Mary Jones a letter, informing her that Bob Smith has made a donation to the American Cancer Society® in her honor. However, the possibility exists that Mary Jones would have preferred that the donation not have been made to the American Cancer Society®, and therefore, she is unlikely to follow-up and make a subsequent donation of her own. Assume, for instance, that Mary Jones would have preferred that the donation have been made to the American Society for the Prevention of Cruelty to Animals (ASPCA®). In such a situation, the American Cancer Society® loses an opportunity to convert Mary Jones into a future donor, and the ASPCA® loses the opportunity to benefit from the initial donation. Moreover, Bob Smith's donation made in Mary Jones' honor does not have the maximum impact of fulfilling Mary Jones' wishes. Existing payment devices and approaches fail to provide technical capabilities to overcome such problems. At least one embodiment of the invention, however, can include requiring active participation by a user with respect to multiple types of payment recipients by locking a second portion of pre-paid funds (designated, for example, for discretionary use) until a first portion of pre-paid funds (designated, for example, for payment transactions involving one or more charitable entities) has been depleted. Moreover, such an embodiment of the invention can provide an incentive to donate to a charity of the recipient's choice.

By way merely of further illustration, consider the following second example scenario, wherein Mary Jones is having a birthday party, and, in lieu of gifts, she asks her guests to make a donation to any charitable entity. Bob Smith, a guest to the birthday party, does not have a favorite charitable entity, and, as such, he decides to give Mary Jones a monetary gift and informs her to make a donation to her favorite charitable entity herself. However, the possibility exists that Mary Jones forgets to make the charitable donation or otherwise decides to keep the full amount of Bob Smith's monetary gift for herself. In such a situation, no charitable entity receives any portion of Bob Smith's monetary gift. Again, existing payment devices and approaches fail to provide technical capabilities to overcome such problems. However, at least one embodiment of the invention can include requiring active participation by a user with respect to multiple types of payment recipients by locking a second portion of pre-paid funds (designated, for example, for discretionary use) until a first portion of pre-paid funds (designated, for example, for payment transactions involving one or more charitable entities) has been depleted. Moreover, such an embodiment of the invention can provide an incentive to ensure that the funds designated for charitable donation are in fact donated.

In contrast to the disadvantageous examples of existing solutions noted above, consider, by way merely of illustration and not limitation, an example implementation of one or more embodiments of the invention wherein a first user buys and/or provides, to a second user (the cardholder), a dual-balance payment device (such as a physical gift card or a web-based electronic gift card) such as detailed herein. The first user chooses the total dollar amount loaded on the device to be, for instance, $100.00, and the first user also specifies the portion of that $100.00 that must be used on a charitable donation (for example, $25.00) before the remaining portion of the $100.00 (that is, $75.00) on the device can be used by the second user at the second user's discretion. Accordingly, until the designated charitable portion ($25.00) is depleted (in part or in full, depending upon the particular embodiment of the invention), the discretionary amount of the payment device cannot be used by the second user. Consequently, unlike the disadvantageous existing solutions detailed above, such an example embodiment of the invention can include providing an incentive to ensure that funds intended for charitable donation are in fact used for one or more charitable donations.

Additionally, by way merely of illustration and not limitation, consider an additional example implementation of one or more embodiments of the invention wherein a multi-balance payment device (such as detailed herein) is generated for use with multiple specific commercial (that is, non-charitable) entities. For instance, a first user chooses the total dollar amount loaded on the device to be, for instance, $100.00, and the first user also specifies that a first portion (say, $20.00) of the total amount is designated for use exclusively with Dunkin' Donuts®, a second portion (say, $30.00) of the total amount is designated for use exclusively with Whole Foods Market®, and a third portion (say, $50.00) of the total amount is designated for use exclusively with Apple®.

Accordingly, in one or more embodiments of the invention, the level of pre-paid charitable payment balance of the payment device can be determined by a user (such as an first individual seeking to give the card as a gift to a second individual) or an issuer, and then fixed by the issuer. Similarly, the one or more charitable entities associated with the pre-paid charitable payment balance of the payment device can be determined by a user (such as an first individual seeking to give the card as a gift to a second individual) or an issuer, and then fixed by the issuer. The one or more charitable entities can include one or more particular charitable entities specified by the user (that is, the pre-paid charitable balance can only be utilized for payment transactions with the one or more specified charitable entities) or can include a collection of two or more charitable entities from which the end user (cardholder) can ultimately choose for one or more payment transactions (that is, the pre-paid charitable balance can be utilized for payment transactions with any one or more of the entities included in the collection).

As noted above, and as further detailed herein, in one or more embodiments of the invention, the discretionary (for example, non-charitable) portion of the pre-paid funds of the payment device remain locked and/or unavailable for use by the cardholder until the full restricted (for example, charitable) portion is used/depleted.

Alternatively, in one or more embodiments of the invention, the discretionary (for example, non-charitable) portion of the pre-paid funds of the payment device remain locked and/or unavailable for use by the cardholder until the cardholder executes one or more payment transactions from the restricted (for example, charitable) portion of the pre-paid funds.

Alternatively still, in one or more embodiments of the invention, the discretionary (for example, non-charitable) portion of the pre-paid funds of the payment device and the full restricted (for example, charitable) portion of the pre-paid funds can be accessed by the cardholder freely, at the discretion of the cardholder.

Attention should now be given to FIG. 1, which depicts an exemplary embodiment of a system 100, according to an aspect of the invention. System 100 can include one or more different types of portable payment devices. For example, one such device can be a contact device such as card 102. Card 102 can include an integrated circuit (IC) chip 104 having a processor 106 and a memory 108, as well as electrical contacts 110 for communication capabilities. Also, FIG. 1 additionally depicts a contactless device/card 112, which can include an IC chip 114 having a processor 116, a memory 118, and an antenna 120, which can be utilized for contactless communication (such as, for example, using radio frequency (RF) electromagnetic waves). FIG. 1 also depicts a card 150 having a magnetic stripe 152. Additionally, as further detailed herein, another example of a payment device (capable of implementation in one or more embodiments of the invention) can include an appropriately configured mobile device, which can include a cellular telephone handset, a smart phone, a personal digital assistant (PDA), a tablet, a smart watch, etc.

As further described herein, memory components 108 and 118 can include different types of memory, such as volatile and non-volatile memory and read-only and programmable memory. The memory components 108 and 118 can store device/card data such as, for example, a cardholder's primary account number ("PAN") and/or personal identification number ("PIN"). Additionally, the memory components 108 and 118 can store the operating system of the cards (102 and 112, respectively), wherein such an operating system loads and executes one or more applications and provides one or more services to the applications.

As depicted, in one or more embodiments of the invention, the payment device can include a card that includes body portions (for example, laminated plastic layers of a payment card, a case or cabinet of a mobile device, a chip packaging, etc.), memory associated with the body portions, and a processor associated with the body portions and coupled to the memory.

As also depicted in FIG. 1 and further detailed herein, a variety of different types of terminals can be employed with system 100. Such terminals (equipment used to capture, transmit and store payment device transactions) can include a contact terminal 122 configured to interface with contact-type device 102, a wireless terminal 124 configured to interface with wireless device 112, a magnetic stripe terminal 125 configured to interface with a magnetic stripe device 150, and a combined terminal 126. Combined terminal 126, as described herein, can interface with any combination of devices 102, 112 and/or 150. Combined terminal 126 can include a memory 128, a processor 130, a reader module 132, as well as an item interface module such as a bar code scanner 134 and/or an RFID tag reader 136 (each of which can be coupled to the processor 130). Reader module 132 can be configured, for example, for contact communication with device 102, contactless communication with device 112, and/or reading of magnetic stripe 152.

As also depicted in FIG. 1, terminals 122, 124, 125 and 126 can be connected to one or more of processing centers 140, 142 and 144 via one or more networks 138. Such networks 138 can include, for example, the Internet, or a proprietary network (such as a virtual private network (VPN). Additionally, processing centers 140, 142 and 144 can include, for example, a host computer of an issuer of a payment device. Also, one or more of processing centers 140, 142 and 144 can include and/or be linked to a database such as a data warehouse 154.

FIG. 1 additionally depicts points-of-sale (POS) 146 and 148, which can represent charitable and/or commercial/for-profit entities. Also, POS 146 and 148 can be connected to network 138 as a party of system 100.

Figure 2:
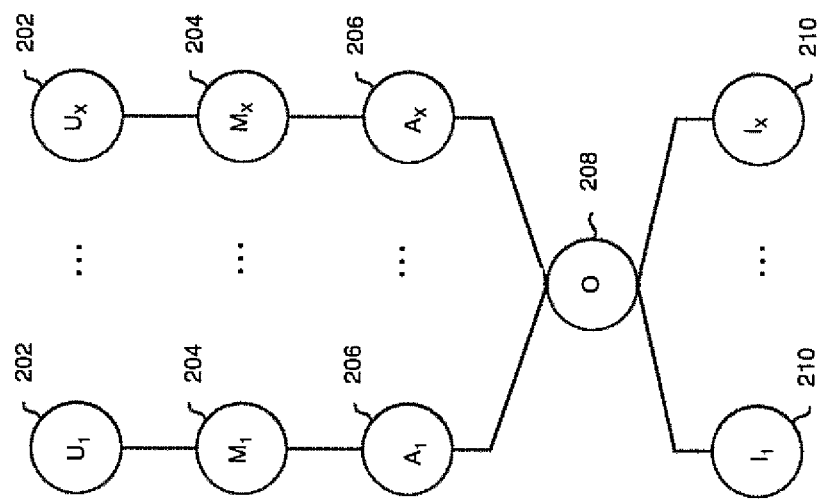
FIG. 2 depicts an exemplary inter-relationship between and among a payment network, users, merchants, acquirers, and issuers.

Attention should now be given to FIG. 2, which depicts an example relationship among multiple entities relevant to payment transactions. As depicted in FIG. 2, multiple distinct users (cardholders) 202, $U_1 \ldots U_x$, interact with multiple distinct merchants (for example, customers of one or more acquirers) 204, $M_1 \ldots M_x$. Merchants 204 additionally interact with multiple distinct acquirers 206, $A_1 \ldots A_x$, and the acquirers 206 interact with multiple distinct issuers 210, $I_1 \ldots I_x$, through, for example, an operator 208 of a payment network configured to facilitate transactions between issuers and acquirers. As used herein, an acquirer refers to a financial institution or other organization (such as a bank or a processor) that processes payment device transactions for other entities (acceptors). Additionally, as used herein, an issuer refers to a financial institution or other organization that issues, or causes to be issued, payment devices to users (cardholders).

Referring again to FIG. 2, during a conventional pre-paid payment device authorization process, the cardholder 202 pays for a purchase (using the payment device) and the merchant 204 submits the transaction to the acquirer 206. The acquirer then verifies the payment device (via, for example, an identification number), the transaction type and the amount with the issuer 210, and withdraws that amount, for the merchant, from the pre-paid balance of the payment device. Additionally, in one or more embodiments of the invention, the acquirer can also verify the status of the recipient of the transaction as one or more user-selected charitable entities (for payment transactions drawing from the relevant pre-paid balance). Further, the acquirer can also verify the status of the status of the charitable transaction pre-paid balance with respect to one or more attempted payment transactions drawing from the separate (non-charitable use) pre-paid balance.

Further, referring again to FIG. 2, in a convention transaction, authorized transactions can be stored in batches, which are sent to the acquirer 206. During subsequent clearing and settlement, the acquirer sends the batch transactions through a relevant association, which debits the issuers 210 for payment and credits the acquirer 206. Once the acquirer 206 has been paid, the acquirer 206 pays the merchant 204.

It will be appreciated that the network 208 shown in FIG. 2 is an example of a payment network, and one or more embodiments of the invention may be employed with other kinds of payment networks. Additionally, as noted herein, one or more embodiments of the invention are applicable to pre-paid cards or devices which support both an online and a preauthorized offline balance but have only limited overall funds available.

Figure 3:
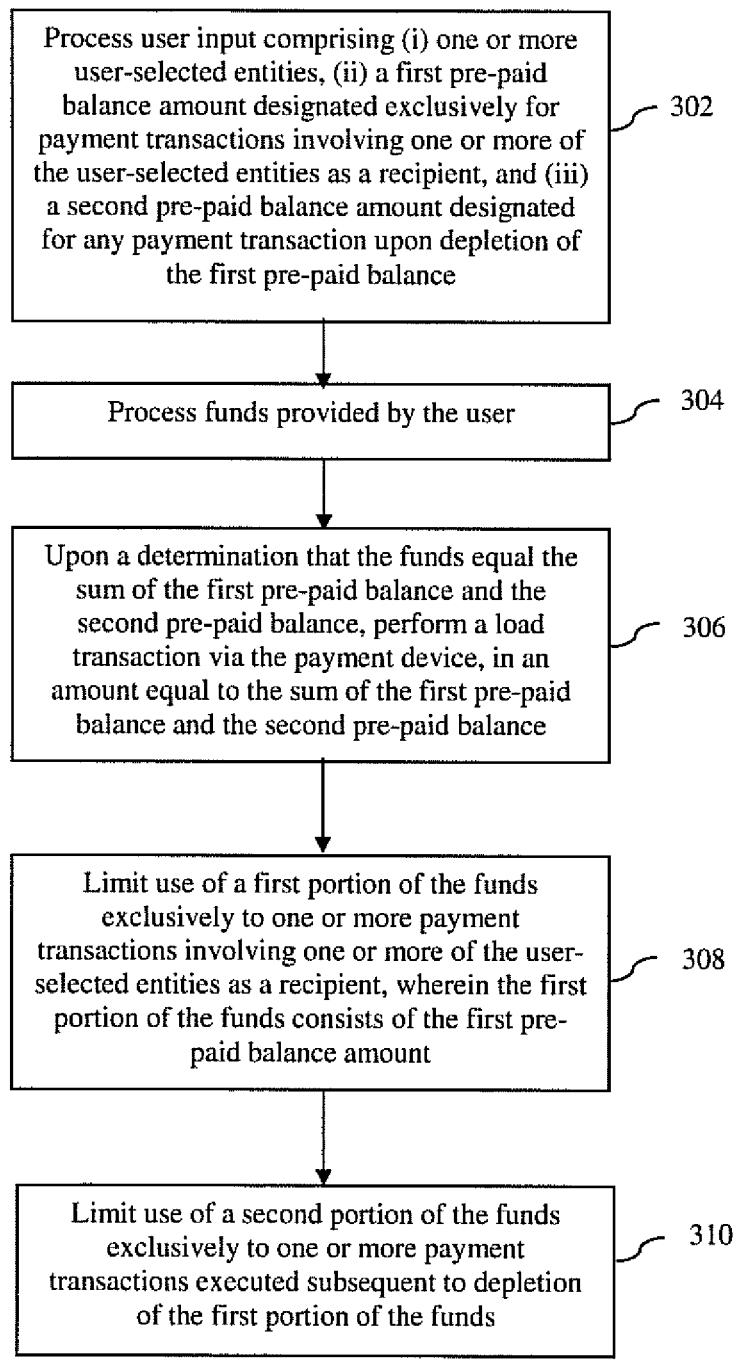
FIG. 3 is a flow diagram illustrating techniques for creating a dual-balance payment device, according to an embodiment of the present invention.

FIG. 3 is a flow diagram illustrating techniques for creating a dual-balance payment device, according to an embodiment of the present invention. Step 302 includes processing user input comprising (i) one or more user-selected entities, (ii) a first pre-paid balance amount designated exclusively for payment transactions involving one or more of the user-selected entities as a recipient, and (iii) a second pre-paid balance amount designated for any payment transaction upon depletion of the first pre-paid balance. The one or more user-selected entities can include one or more user-selected charitable entities. Step 304 includes processing funds provided by the user.

Step 306 includes upon a determination that the funds equal the sum of the first pre-paid balance and the second pre-paid balance, performing a load transaction via the payment device, in an amount equal to the sum of the first pre-paid balance and the second pre-paid balance. In at least one embodiment of the invention, performing the load transaction can include rendering the amount equal to the sum of the first pre-paid balance and the second pre-paid balance on the payment device. Additionally, in at least one embodiment of the invention, performing the load transaction can include rendering the amount equal to amount equal to the sum of the first pre-paid balance and the second pre-paid balance at a backend server of a payment provider linked to the payment device. Also, at least one embodiment of the invention can include repeating performing a load transaction via the payment device (that is, re-loading the payment device), in an amount equal to the sum of the first pre-paid balance and/or the second pre-paid balance.

As further described herein, performing the load transaction can include accessing a memory space on the payment device, and causing the amount equal to the sum of the first pre-paid balance and the second pre-paid balance to be entered (for example, by writing) into the memory space on the payment device. Alternatively, one or more embodiments of the invention can include accessing a memory space on the payment device associated with a first application, wherein the first application corresponds exclusively with payment transactions to user-selected entities, and causing the amount equal to the sum of the first pre-paid balance to be entered (for example, by writing) into the memory space associated with the first application. Additionally, such an embodiment can also include accessing a memory space on the payment device associated with a second application, wherein the second application corresponds with payment transactions permitted only after the funds associated with the first application have been depleted, and causing the amount equal to the sum of the second pre-paid balance to be entered (for example, by writing) into the memory space associated with the second application.

Further still, in at least one embodiment of the invention, performing the load transaction can include accessing a memory space on a backend server (for example, an issuer's server), and causing the amount equal to the sum of the first pre-paid balance and the second pre-paid balance to be entered (for example, by writing) into the memory space on the backend server.

Step 308 includes limiting use of a first portion of the funds exclusively to one or more payment transactions involving one or more of the user-selected entities as a recipient, wherein the first portion of the funds consists of the first pre-paid balance amount. Step 310 includes limiting use of a second portion of the funds exclusively to one or more payment transactions executed subsequent to depletion of the first portion of the funds. Additionally, as detailed herein, the steps depicted in FIG. 3 can be carried out by at least one computing device.

Figure 4:
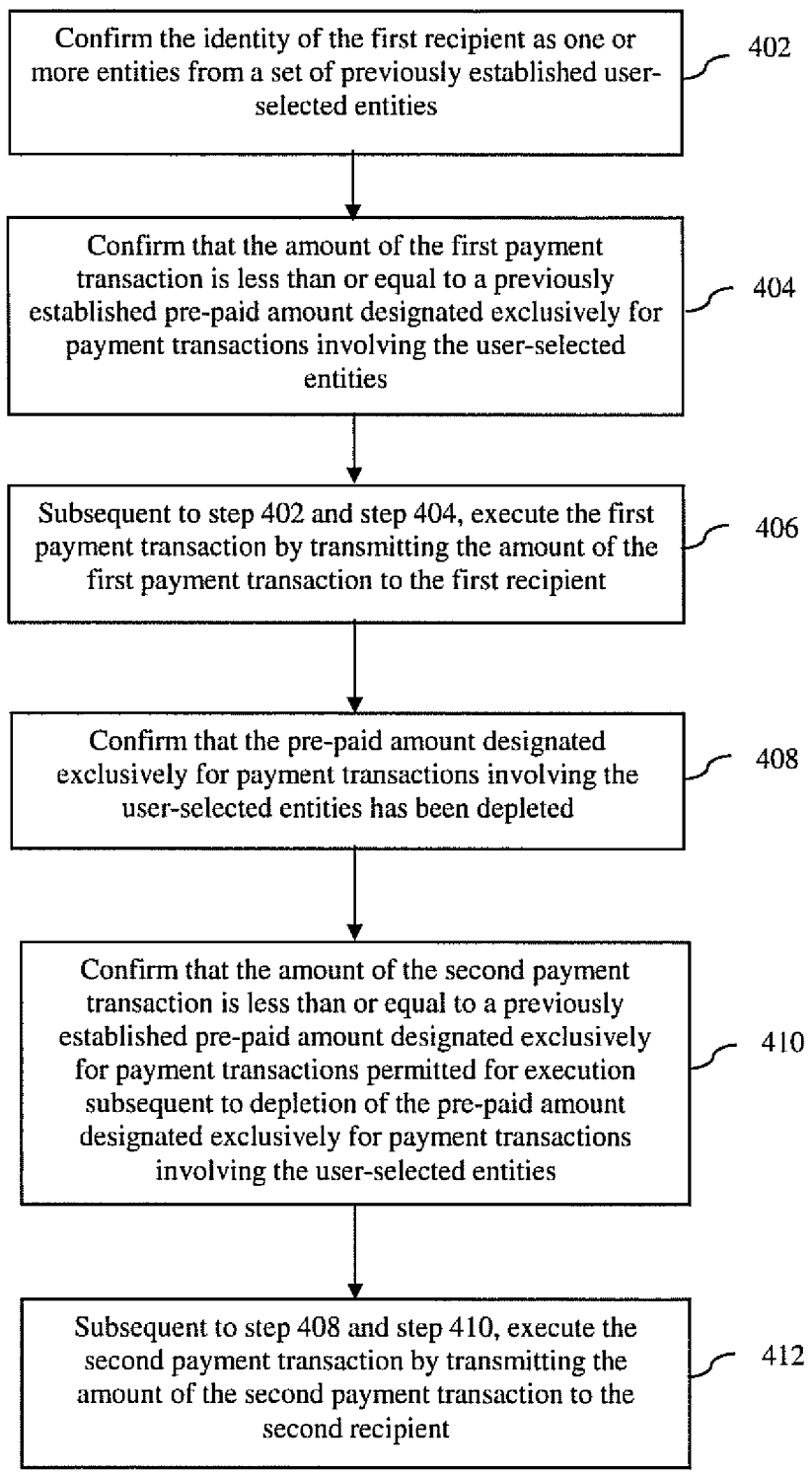
FIG. 4 is a flow diagram illustrating techniques according to an embodiment of the invention.

FIG. 4 is a flow diagram illustrating techniques according to an embodiment of the present invention. Upon receiving a request for executing a first payment transaction between the payment device and a first recipient, step 402 and step 404 can be carried out. Step 402 includes confirming the identity of the first recipient as one or more entities from a set of previously established user-selected entities. The user-selected entities can include, for example, user-selected charitable entities. Step 404 includes confirming that the amount of the first payment transaction is less than or equal to a previously established pre-paid amount designated exclusively for payment transactions involving the user-selected entities.

Subsequent to step 402 and step 404, step 406 includes executing the first payment transaction by transmitting the amount of the first payment transaction to the first recipient.

Upon receiving a request for executing a second payment transaction between the payment device and a second recipient, step 408 and step 410 can be carried out. Step 408 includes confirming that the pre-paid amount designated exclusively for payment transactions involving the user-selected entities has been depleted. Step 410 includes confirming that the amount of the second payment transaction is less than or equal to a previously established pre-paid amount designated exclusively for payment transactions permitted for execution subsequent to depletion of the pre-paid amount designated exclusively for payment transactions involving the user-selected entities.

Subsequent to step 408 and step 410, step 412 includes, executing the second payment transaction by transmitting the amount of the second payment transaction to the second recipient. Additionally, as detailed herein, the steps depicted in FIG. 4 can be carried out by at least one backend server (such as an issuer server, for example).

The techniques depicted in FIG. 4 can also include rejecting the first payment transaction upon a failure to carry out the confirmation at least one of step 402 and step 404. Further, at least one embodiment of the invention can include rejecting the second payment transaction upon a failure to carry out the confirmation at least one of step 408 and step 410.

Also, the techniques depicted in FIG. 4 can also include generating an output that can include a display of at least one of (i) a remaining balance of the pre-paid amount designated exclusively for payment transactions involving the user-selected entities, (ii) a remaining balance of the pre-paid amount designated exclusively for payment transactions permitted for execution subsequent to depletion of the pre-paid amount designated exclusively for payment transactions involving the user-selected entities, and (iii) a summary of payment transactions executed by the payment device.

At least one embodiment of the invention (such as the techniques depicted in FIG. 3 and/or FIG. 4, for example), can include implementing a service via a transmission server to receive data from a data source and send selected data to users (for example, at a provided destination address of a wireless device (such as a number for a cellular phone, etc.)). The transmission server includes a memory, a transmitter, and a microprocessor. Such an embodiment of the invention can also include providing a viewer application to the users for installation on their individual devices. Additionally, in such an embodiment of the invention, after a user enrolls, the service receives pre-paid amounts for both charitable and unrestricted expenditures, as well as an identification of one or more charitable entities, sent from a data source to the transmission server. The server can process the information, for example, based upon user-provided user preference information that is stored in memory on the server. Subsequently, an alert is generated containing the payment device information. The alert can be formatted into data blocks, for example, based upon any provided alert format preference information. Subsequently, the alert and/or formatted data blocks are transmitted over a data channel to the user's wireless device. After receiving the alert, the user can connect the wireless device to the user's computer, whereby the alert causes the user's computer to automatically launch the application provided by the service to display the alert. When connected to the Internet, the user may then use the viewer application (for example, via clicking on a URL associated with the data source provided in the alert) to facilitate a connection from the remote user computer to the data source over the Internet for additional information.

Figure 5:
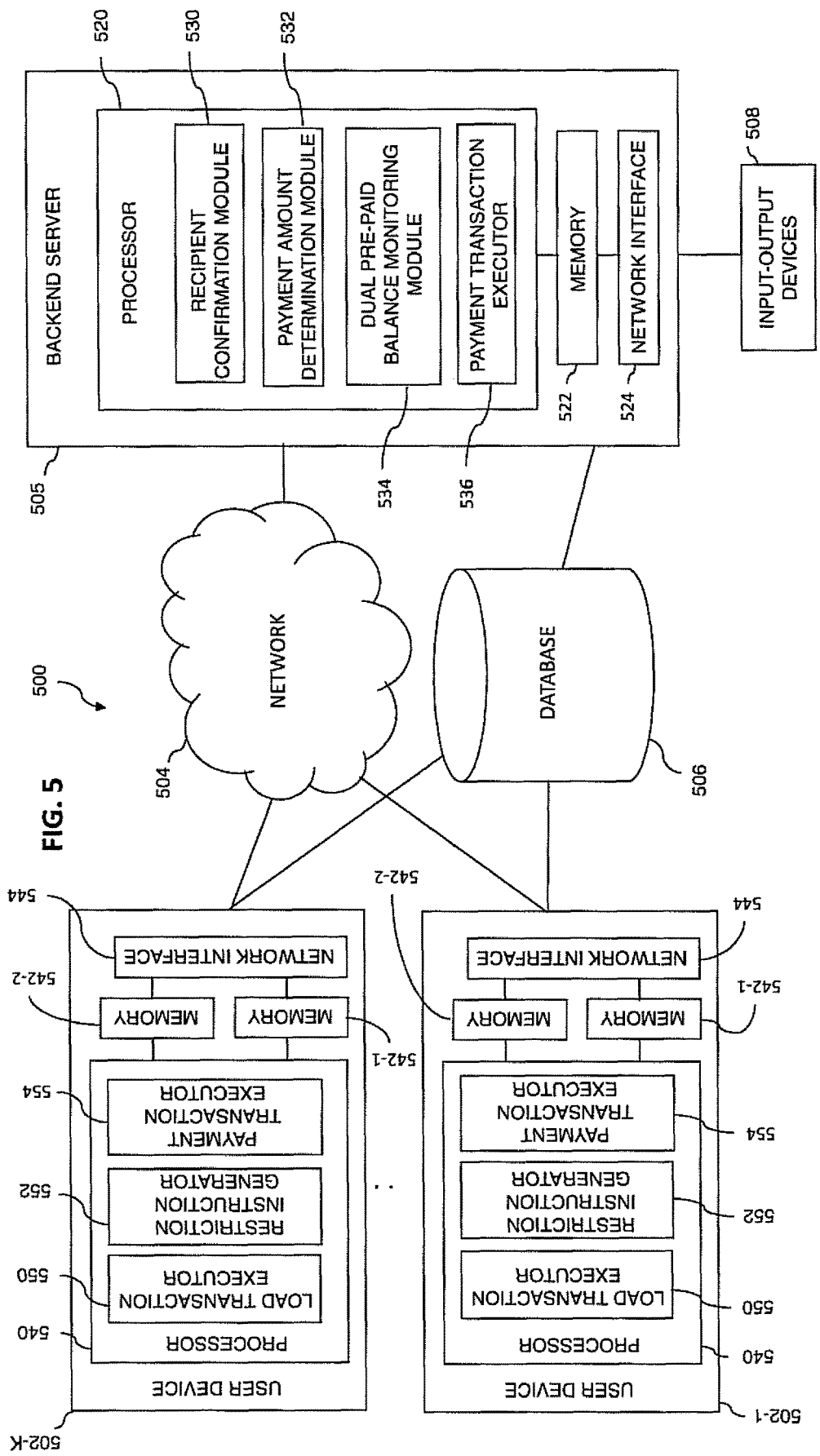
FIG. 5 is a computer network configured in accordance with an illustrative embodiment of the invention.

FIG. 5 shows a computer network 500 configured in accordance with an illustrative embodiment of the invention. The computer network 500 comprises a plurality of user devices 502-1 . . . 502-K, collectively referred to herein as user devices 502. The user devices 502 are coupled to a network 504, where the network 504 can represent a sub-network or other related portion of the larger computer network 500. Accordingly, elements 500 and 504 are both referred to herein as examples of "networks" but the latter is assumed to be a component of the former in the context of the FIG. 5 embodiment. Also coupled to the network 504 is a backend server 505 (such as, for example, a server of an issuer).

The user devices 502 may comprise, for example, payment devices such as stored value cards (such as smart cards having one or more integrated circuit chips), mobile devices, smart phones, laptop computers, tablet computers, desktop computers, smart watches, or other types of devices capable of supporting payment transactions. Such devices are examples of what can be more generally referred to herein as "processing devices."

By way merely of example and/or illustration, user devices 502 can include a portable payment device in accordance with one or more embodiments of the invention. Such a portable payment device can include a body portion, at least one memory 542-1, 542-2 (collectively, memory 542) associated with the body portion, and at least one processor 540 associated with the body portion and coupled to the at least one memory 542. In at least one embodiment of the invention, the memory 542 can include a single memory space that can be partitioned into multiple portions for separate applications (which can be used to load separate and distinct collections of funds). Alternative, and as depicted in the example FIG. 5 embodiment, the memory 542 can include two memory spaces (542-1 and 542-2). In such an embodiment, memory 542-1 can contain a first stored value application having a first application balance, and memory 542-2 can contain a second stored value application having a second application balance.

As further described herein in connection, for example, with the backend server 505, user devices 502 can also include a network interface 544.

The processor 540 can be operative to perform one or more of the method steps described herein via one or more modules and/or components contained therein. Such components, as illustrated in FIG. 5, can include a load transaction executor 550, a restriction instruction generator 552, and a payment transaction executor 554.

By way of example, the processor 540 can be operative, via the load transaction executor 550, to perform a first load transaction, in an amount equal to the first application balance, via the first stored value application contained within memory 542-1. Additionally, the processor 540 can be operative, via the restriction instruction generator 552, to implement, in memory 542-1, a first instruction restricting any payment transaction carried out via the first stored value application to a payment transaction wherein the recipient exclusively consists of one or more user-selected entities. By way of example, in one or more embodiments of the invention, the one or more user-selected entities can include one or more user-selected charitable entities. Further, the processor 540 can also be operative, via the load transaction executor 550, to perform a second load transaction, in an amount equal to the second application balance, via the second stored value application contained within memory 542-2. Additionally, in such an embodiment, the processor 540 can also be operative, via the restriction instruction generator 552, to implement, in memory 542-2, a second instruction precluding performance of any payment transaction carried out via the second stored value application prior to depletion of the first application balance.

In one or more embodiments of the invention, the processor 540 can further be operative, via the payment transaction executor 554, to perform a first payment transaction, in an amount less than or equal to the first application balance, via the first stored value application contained within memory 542-1, wherein the first payment transaction includes, as a recipient, one or more of the user-selected entities. Additionally, in such an embodiment, the processor 540 can be operative, via the payment transaction executor 554, to perform a second payment transaction, in an amount less than or equal to the second application balance, via the second stored value application contained within memory 542-2, upon a determination that the first application balance is depleted. In such an embodiment, the first application balance can be pre-determined by a user, and the second application balance can be pre-determined by a user.

Also, in one or more embodiments of the invention, (i) the first application balance, (ii) the first instruction, (iii) the second application balance, and (iv) the second instruction can be embodied in one or more of multiple options. For example, such embodying can include via an alphanumeric code issued in conjunction with the user device 502, via a barcode issued in conjunction with the user device 502, and/or via a magnetic strip implemented on the user device 502. Accordingly, in one or more embodiments of the invention, attempted payment transactions can be carried out by the cardholder online via text, email, etc., as well as via interaction with a terminal by way of a scanner or reader.

As further detailed herein, in at least one embodiment of the invention, performing a first load transaction via the first stored value application can include rendering the amount equal to the first application balance at the backend server 505 of a payment provider linked to the user device 502. Similarly, in such an embodiment, performing a second load transaction via the second stored value application can include rendering the amount equal to the second application balance at the backend server 505.

The network 504 is assumed to comprise a portion of a global computer network such as the Internet, although other types of networks can be part of the computer network 500, including a wide area network (WAN), a local area network (LAN), a satellite network, a telephone or cable network, a cellular network, a wireless network such as a Wi-Fi or WiMAX network, or various portions or combinations of these and other types of networks. The computer network 500 in some embodiments therefore comprises combinations of multiple different types of networks, each comprising processing devices configured to communicate using internet protocol (IP) or other related communication protocols.

The database 506, in one or more embodiments of the invention, can be implemented using one or more storage systems associated with the backend server 505. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the backend server 505 are input-output devices 508, which illustratively comprise keyboards, displays or other types of input-output devices in any combination. Such input-output devices are used to support one or more user interfaces to the backend server 505, as well as to support communication between the backend server 505 and other related systems and devices not explicitly shown. In addition, the phrase "input/output interface" as used herein, is intended to include, for example, a mechanism for inputting data to the processing unit (for example, mouse), and a mechanism for providing results associated with the processing unit (for example, printer). The processor 520, memory 522, and input/output devices 508 (such as a display and a keyboard) can be interconnected, for example, via a bus as part of a data processing unit (such as backend server 505 and/or user device 502). Suitable interconnections, for example via a bus, can also be provided to a network interface 524, such as a network card, which can be provided to interface with a computer network, and to a media interface, which can be provided to interface with media.

The backend server 505 in the FIG. 5 embodiment is assumed to be implemented using at least one processing device. Each such processing device generally comprises at least one processor and an associated memory, and implements one or more functional modules for controlling certain features of the backend server 505. Also, as used herein, a "server" can include a physical data processing system running a server program.

More particularly, the backend server 505 in this embodiment comprises a processor 520 coupled to a memory 522 and a network interface 524.

The processor 520 illustratively comprises a microprocessor, a microcontroller, an application-specific integrated circuit (ASIC), a field-programmable gate array (FPGA) or other type of processing circuitry, as well as portions or combinations of such circuitry elements.

The memory 522 can include random access memory (RAM), read-only memory (ROM) or other types of memory, in any combination. The memory 522 and other memories disclosed herein may be viewed as examples of what are more generally referred to as "processor-readable storage media" storing executable computer program code or other types of software programs.

One or more embodiments of the invention include articles of manufacture, such as processor-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 524 allows the backend server 505 to communicate over the network 504 with the user devices 502, and illustratively comprises one or more conventional transceivers.

The processor 520 further comprises a recipient confirmation module 530, a payment amount determination module 532, a dual pre-paid balance monitoring module 534 and a payment transaction executor 536.

It is to be appreciated that this particular arrangement of modules 530, 532, 534 and 536 illustrated in the processor 520 of the FIG. 5 embodiment is presented by way of example only, and alternative arrangements can be used in other embodiments. For example, the functionality associated with the modules 530, 532, 534 and 536 in other embodiments can be combined into a single module, or separated across a larger number of modules. As another example, multiple distinct processors can be used to implement different ones of the modules 530, 532, 534 and 536 or portions thereof.

At least portions of the recipient confirmation module 530, payment amount determination module 532, dual pre-paid balance monitoring module 534 and payment transaction executor 536 may be implemented at least in part in the form of software that is stored in memory 522 and executed by processor 520.

It is to be understood that the particular set of elements shown in FIG. 5 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the backend server 505 can be eliminated and associated elements such as recipient confirmation module 530, payment amount determination module 532, dual pre-paid balance monitoring module 534 and payment transaction executor 536 can be implemented elsewhere in the computer network 500.

An exemplary process utilizing recipient confirmation module 530, payment amount determination module 532, dual pre-paid balance monitoring module 534 and payment transaction executor 536 of the backend server 505 in computer network 100 is described in more detail with reference to the flow diagram of FIG. 4.

Accordingly, the particular processing operations and other network functionality described herein are presented by way of illustrative example only, and should not be construed as limiting the scope of the invention in any way.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices.

The cloud infrastructure may additionally or alternatively comprise other types of virtualization infrastructure such as virtual machines implemented using a hypervisor. The underlying physical machines may comprise one or more distributed processing platforms that include one or more storage systems.

The cloud infrastructure noted above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a Wi-Fi or WiMAX network, or various portions or combinations of these and other types of networks.

Additionally, it is understood in advance that implementation of the teachings recited herein are not limited to a particular computing environment. Rather, embodiments of the present invention are capable of being implemented in conjunction with any type of computing environment now known or later developed.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are referred to herein as "processor-readable storage media" storing executable program code of one or more software programs.

As indicated above, articles of manufacture and other computer program products comprising such processor-readable storage media can serve as embodiments of the present invention. A processor-readable storage medium, as used herein, is not to be construed as being transitory signals per se, such as radio waves or other freely propagating electromagnetic waves, electromagnetic waves propagating through a waveguide or other transmission media, or electrical signals transmitted through a wire. Processor-readable program instructions described herein can be downloaded to respective processing devices from a processor-readable storage medium or to an external computer or external storage device via a network. Such a network can include copper transmission cables, optical transmission fibers, wireless transmission, routers, firewalls, switches, gateway computers and/or edge servers. Additionally, the processor-readable program instructions can execute entirely on the user's processing device, partly on the user's processing device, as a stand-alone software package, partly on the user's processing device and partly on a remote processing device or entirely on the remote processing device or server.

Also included in a processing device is network interface circuitry, which is used to interface the processing device with the network and other system components, and may include conventional transceivers.

Additionally, processing devices (such as user devices 502 and backend server 505) and other computer network components can communicate with one another using a variety of different communication protocols and associated communication media.

The above-described illustrative embodiments provide significant technical advantages relative to conventional approaches. For example, some embodiments are configured to provide technical capability for requiring active participation by a cardholder to conduct a payment transaction to a charitable entity prior to enabling subsequent payment transactions using the payment device. These and other embodiments can effectively render such payment devices more versatile in use and function.

Also, the terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A portable dual-balance payment device comprising:
a body portion comprising a contactless card;
an integrated circuit contained within the body portion, wherein the integrated circuit comprises:
contactless communication componentry comprising at least one antenna;
at least one memory containing at least (i) a first stored value application having a first application balance and (ii) a second stored value application having a second application balance; and
at least one processor coupled to the at least one memory, wherein the at least one processor is operative to:
configure the at least one memory by partitioning at least a portion of the at least one memory into two distinct sub-components and configuring portions of an operating system of the portable dual-balance payment device across the two distinct sub-components of the at least one memory;
execute at least portions of the operating system configured across the two distinct sub-components of the at least one memory by:
allocating a first portion of a set of pre-paid funds, in an amount equal to the first application balance, to a first of the two distinct sub-components of the at least one memory via the first stored value application;
implementing, in the first of the two distinct sub-components of the at least one memory, a first instruction restricting any payment transaction carried out via the first stored value application to a payment transaction wherein the recipient exclusively consists of one or more user-selected entities;
allocating a second portion of the set of pre-paid funds, in an amount equal to the second application balance, to a second of the two distinct sub-components of the at least one memory via the second stored value application; and
implementing, in the second of the two distinct sub-components of the at least one memory, a second instruction precluding performance of any payment transaction carried out via the second stored value application prior to payment of the first application balance in full to at least one of the one or more user-selected entities.

2. The portable dual-balance payment device of claim 1, wherein the at least one processor is further operative to:
perform a first payment transaction, in an amount less than or equal to the first application balance, via the first stored value application contained, wherein the first payment transaction includes, as a recipient, at least one of the one or more user-selected entities.

3. The portable dual-balance payment device of claim 1, wherein the at least one processor is further operative to:
perform a second payment transaction, in an amount less than or equal to the second application balance, via the second stored value application contained, upon a determination that the first application balance has been spent in full.

4. The portable dual-balance payment device of claim 1, wherein each of (i) the first application balance and (ii) the second application balance is pre-determined by a user.

5. The portable dual-balance payment device of claim 1, wherein the payment device comprises a smart card.

6. The portable dual-balance payment device of claim 1, wherein allocating the first set of funds via the first stored value application comprises rendering the amount equal to the first application balance.

7. The portable dual-balance payment device of claim 1, wherein allocating the first set of funds via the first stored value application comprises rendering the amount equal to the first application balance at a backend server of a payment provider linked to the payment device.

8. The portable dual-balance payment device of claim 1, wherein allocating the second set of funds via the second stored value application comprises rendering the amount equal to the second application balance.

9. The portable dual-balance payment device of claim 1, wherein allocating the second set of funds via the second stored value application comprises rendering the amount equal to the second application balance at a backend server of a payment provider linked to the payment device.

10. The portable dual-balance payment device of claim 1, wherein (i) the first application balance, (ii) the first instruction, (iii) the second application balance, and (iv) the second instruction are embodied via an alphanumeric code issued in conjunction with the payment device.

11. The portable dual-balance payment device of claim 1, wherein (i) the first application balance, (ii) the first instruction, (iii) the second application balance, and (iv) the second instruction are embodied via a barcode issued in conjunction with the payment device.

12. The portable dual-balance payment device of claim 1, wherein (i) the first application balance, (ii) the first instruction, (iii) the second application balance, and (iv) the second instruction are embodied via a magnetic strip implemented on the payment device.

13. A portable dual-balance payment device comprising:
a body portion comprising a contact card;
an integrated circuit contained within the body portion, wherein the integrated circuit comprises:
one or more electrical contacts;

at least one memory containing at least (i) a first stored value application having a first application balance and (ii) a second stored value application having a second application balance; and at least one processor coupled to the at least one memory, wherein the at least one processor is operative to:

configure the at least one memory by partitioning at least a portion of the at least one memory into two distinct sub-components and configuring portions of an operating system of the portable dual-balance payment device across the two distinct sub-components of the at least one memory;

execute at least portions of the operating system configured across the two distinct sub-components of the at least one memory by:

allocating a first portion of a set of pre-paid funds, in an amount equal to the first application balance, to a first of the two distinct sub-components of the at least one memory via the first stored value application;

implementing, in the first of the two distinct sub-components of the at least one memory, a first instruction restricting any payment transaction carried out via the first stored value application to a payment transaction wherein the recipient exclusively consists of one or more user-selected entities;

allocating a second portion of the set of pre-paid funds, in an amount equal to the second application balance, to a second of the two distinct sub-components of the at least one memory via the second stored value application; and implementing, in the second of the two distinct sub-components of the at least one memory, a second instruction precluding performance of any payment transaction carried out via the second stored value application prior to payment of the first application balance in full to at least one of the one or more user-selected entities.

14. The portable dual-balance payment device of claim 13, wherein the at least one processor is further operative to:
perform a first payment transaction, in an amount less than or equal to the first application balance, via the first stored value application contained, wherein the first payment transaction includes, as a recipient, at least one of the one or more user-selected entities.

15. The portable dual-balance payment device of claim 13, wherein the at least one processor is further operative to:
perform a second payment transaction, in an amount less than or equal to the second application balance, via the second stored value application contained, upon a determination that the first application balance has been spent in full.

16. The portable dual-balance payment device of claim 13, wherein each of (i) the first application balance and (ii) the second application balance is pre-determined by a user.

17. The portable dual-balance payment device of claim 13, wherein (i) the first application balance, (ii) the first instruction, (iii) the second application balance, and (iv) the second instruction are embodied via an alphanumeric code issued in conjunction with the payment device.

18. The portable dual-balance payment device of claim 13, wherein (i) the first application balance, (ii) the first instruction, (iii) the second application balance, and (iv) the second instruction are embodied via a barcode issued in conjunction with the payment device.

19. The portable dual-balance payment device of claim 13, wherein (i) the first application balance, (ii) the first instruction, (iii) the second application balance, and (iv) the second instruction are embodied via a magnetic strip implemented on the payment device.

* * * * *